United States Patent

Arhab et al.

[11] Patent Number: 5,904,231
[45] Date of Patent: May 18, 1999

[54] FLUID COUPLING APPARATUS, ESPECIALLY FOR A MOTOR VEHICLE TRANSMISSION

[75] Inventors: Rabah Arhab, Pierrefitte; Daniel Maingaud, Le Plessis Bouchard, both of France

[73] Assignee: Valeo, Paris, France

[21] Appl. No.: 08/793,200

[22] PCT Filed: Jun. 21, 1996

[86] PCT No.: PCT/FR96/00972

§ 371 Date: Feb. 20, 1997

§ 102(e) Date: Feb. 20, 1997

[87] PCT Pub. No.: WO97/01048

PCT Pub. Date: Jan. 9, 1997

[30] Foreign Application Priority Data

Jun. 22, 1995 [FR] France ................................. 95 07627

[51] Int. Cl.⁶ .................................................. F16H 45/02
[52] U.S. Cl. ........................................ 192/3.29; 192/3.28
[58] Field of Search .................................. 192/3.29, 3.28, 192/212; 60/338

[56] References Cited

U.S. PATENT DOCUMENTS

| | | |
|---|---|---|
| 4,875,562 | 10/1989 | Fujimoto . |
| 5,086,892 | 2/1992 | Schierling ............................... 192/3.29 |
| 5,215,173 | 6/1993 | Gimmler ........................... 192/3.29 X |
| 5,337,867 | 8/1994 | Kirkwood ............................... 192/3.29 |
| 5,690,199 | 11/1997 | Annic et al. ....................... 192/3.28 X |

FOREIGN PATENT DOCUMENTS

| | | |
|---|---|---|
| 0358318 | 3/1990 | European Pat. Off. . |
| 4109485 | 9/1992 | Germany . |
| 94-07058 | 3/1994 | WIPO . |

*Primary Examiner*—Rodney H. Bonck
*Attorney, Agent, or Firm*—Longacre & White

[57] ABSTRACT

The invention proposes a fluid coupling apparatus in which the turbine wheel (28) is coupled in rotation to a shaft (34) through an interposed hub (36) made in one piece in sheet metal, which comprises an internally toothed sleeve portion (70) and an externally splined cylindrical skirt portion (66), for coupling together in rotation the hub (36) and an output member (60) of a lock-up clutch (16) of the fluid coupling apparatus (10).

12 Claims, 2 Drawing Sheets

FLUID COUPLING APPARATUS, ESPECIALLY FOR A MOTOR VEHICLE TRANSMISSION

BACKGROUND OF THE INVENTION

1. Field of the Invention

The present invention relates to a fluid coupling apparatus, especially for a motor vehicle transmission.

2. Description of the Related Art

The invention is concerned with an apparatus of the same type as that described and shown in the documents U.S. Pat. No. 4,875,562 and WO-A-94/07058.

In these known designs, such a fluid coupling apparatus is of the type comprising a turbine wheel which is coupled to a turbine wheel hub constituting a driven element, for rotation of the latter with the turbine wheel whereby to couple the latter in rotation with an output shaft, together with an impulse wheel which is coupled to a driving element for rotation with the latter, and of the type comprising a lockup clutch which is adapted to act between the driving element and the driven element, and which comprises two coaxial parts which are mounted for movement of one with respect to the other against the action of circumferentially acting springs, the said parts being an input part comprising a piston, and an output part which is extended radially inwardly by a radial plate element for coupling it in rotation with the hub of the turbine wheel.

A locking clutch, usually called a "lock-up" clutch, for the fluid coupling apparatus is interposed operatively between a driving element and a driven element, and includes a torsion damper, a piston which is mounted for axial movement with respect to the driven element, and at least one friction liner which is associated with the piston and which is adapted to be gripped between the piston and a counter-piston.

In the document U.S. Pat. No. 4,875,562, the piston is so configured as to constitute the input part of the torsion damper, and it carries a friction liner which is arranged to come into contact with the transverse wall of the housing of the fluid coupling apparatus, with this wall constituting the counter piston.

The housing is a sealed casing which is filled with oil, and it is arranged to be coupled in rotation to a driving shaft.

The output part of the damper is fixed to the turbine wheel of the fluid coupling apparatus.

The turbine wheel is fixed to a hub which is arranged to be coupled to a driven shaft for rotation of the latter with it.

Thus, the casing constitutes a driving element, while the hub of the turbine constitutes a driven element, and the lock-up clutch is adapted to act between the casing and the turbine wheel so as to form a bridging means between these latter.

In the document U.S. Pat. No. 4,875,562, the torsion damper includes the piston which retains the springs (or resilient members) externally, together with a guide ring, which may be of divided form, which is carried by the piston, and retains the springs on the inside by virtue of retaining lugs.

The input part thus consists of the piston and the guide ring, while the output part comprises an annular damper plate which is fixed to the turbine wheel.

The output damper plate has engagement lugs which penetrate between the circumferencial ends of two consecutive springs so as to act on these latter.

Each of these lugs penetrates radially between two engagement lugs which are associated with the piston and the guide ring, respectively.

In the document WO-A-94/07058, the guide ring and the damper plate have retaining portions for retaining the springs on the outside and on the inside respectively.

In addition, the damper plate and the guide ring have engagement lugs for acting on the circumferencial ends of the springs.

Because of the retaining means it is possible, after the springs have been fitted by snap fitting of the damper plate behind snap-fitting lugs, to create a unitary sub-assembly which cannot be lost, which is capable of being handled and transported, and which comprises the piston and the torsion damper, this sub-assembly being then able to be fitted in position on the turbine hub.

In the designs proposed in the two said documents, the structure of the turbine hub and the ways used for fastening and/or coupling in rotation the turbine wheel and/or the radial connecting plate element of the output part, are of particular complexity, and are expensive to carry out.

In the document U.S. Pat. No. 4,875,562, the hub of the turbine wheel is a heavy machined component which comprises a radially internal portion in the form of a sleeve, in which internal axial splines are machined. The hub includes a radial plate portion that extends radially outwardly, and on which the turbine wheel is fixed by a set of rivets in the vicinity of that portion of it which lies radially towards the inside, while its radially outward portion includes axial lugs which extend towards the torsion damper. The output part of the lock-up clutch is also guided on a machined cylindrical surface of the radially inner part of the hub of the turbine wheel.

In the document WO-A-94/07058, the output part includes a radial plate element for coupling in rotation, which extends radially inwardly towards an internally splined sleeve, at one end of which it is fitted by seaming, while the turbine wheel is fitted by riveting on a middle portion of the connecting plate portion, in the region of that part of the latter that lies radially towards the inside. In another design, the splined sleeve includes a radial connecting plate portion which is made in one piece and machined, with the radial plate element that connects the output part and the turbine wheel for rotation together being fixed by riveting to its radially outer periphery.

SUMMARY OF THE INVENTION

All the designs which have just been described, of the turbine hub and the means for fastening and/or coupling together in rotation the turbine wheel and the output part of the lock-up clutch damper, are very expensive, in that they call for numerous machining operations, while they require complex assembly operations which are difficult to automate. In addition, the turbine wheel is heavy.

In order to overcome these drawbacks, the invention proposes a new design for a fluid coupling apparatus of the type described above, characterised in that the hub of the turbine wheel is made in one piece and comprises:

- a cylindrical skirt portion formed with external teeth, which is mounted for axial sliding movement in a toothed central hole of the radial plate element of the output part of the lock-up clutch;
- a sleeve portion having internal splines and mounted on a splined portion of the output shaft; and
- an annular radial connecting plate element joining the splined skirt portion to the splined sleeve portion.

In accordance with other features of the invention:

the toothed skirt portion extends axially substantially in line with the splined sleeve portion;

the connecting plate element joins an axial end of the splined sleeve portion to an axial end of the toothed skirt portion, and the connecting plate element lies substantially in a radial plane;

the hub of the turbine wheel is a sheet metal component;

the piston includes a flange for centring the piston with respect to the hub of the turbine wheel;

a centring piece is interposed between the centring flange of the piston and the hub of the turbine wheel;

the centring piece includes a cylindrical internal wall portion mounted on the splined sleeved portion, a cylindrical external wall portion on which the centring flange is mounted, and a radial wall portion connecting the cylindrical internal wall portion and external wall portion together;

the cylindrical external wall portion is joined to the radial connecting wall portion at a first axial end, and its second axial end is fixed to the hub of the turbine wheel;

the second axial end of the cylindrical external wall portion of the centring piece is extended axially outwardly by an annular fastening flange which is adjacent to a radial surface, in facing relationship with it, of the connecting plate element of the hub of the turbine wheel, and which is fixed to that radial surface;

the centring piece is a sheet metal component;

the turbine wheel is fixed to the connecting plate element of the hub of the turbine wheel;

the turbine wheel is fixed on the radial surface of the connecting plate element which is opposite to the radial surface to which the annular fastening flange is adjacent.

Further features and advantages of the invention will appear on a reading of the following detailed description, for an understanding of which, reference is made to the attached drawings in which;

DETAILED DESCRIPTION OF THE PREFERRED EMBODIMENT

Figure 1:
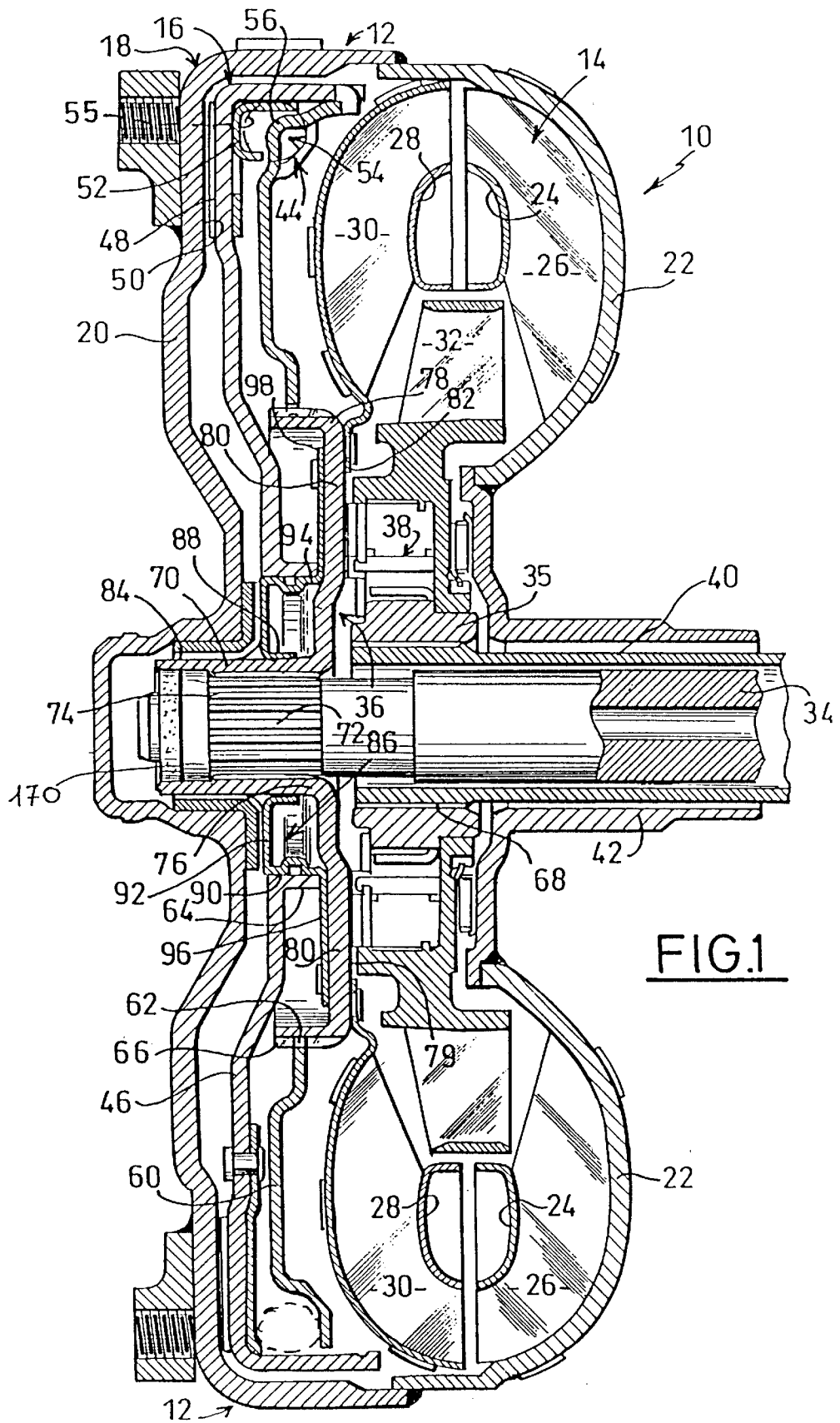
FIG. 1 is a view an axial cross section of a fluid coupling apparatus made in accordance with the feature.
Figure 3:
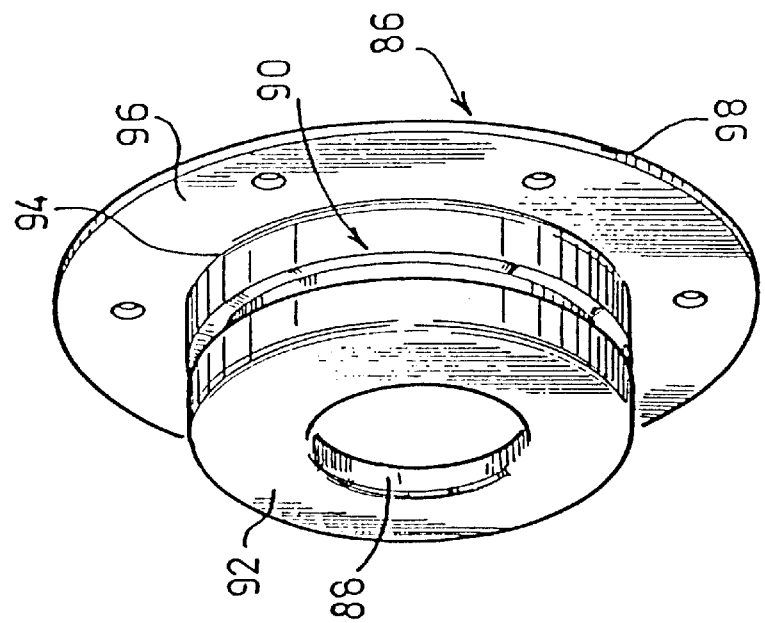
FIG. 3 is a perspective view of the centring piece for centring the piston on the hub of the turbine wheel.
Figure 2:
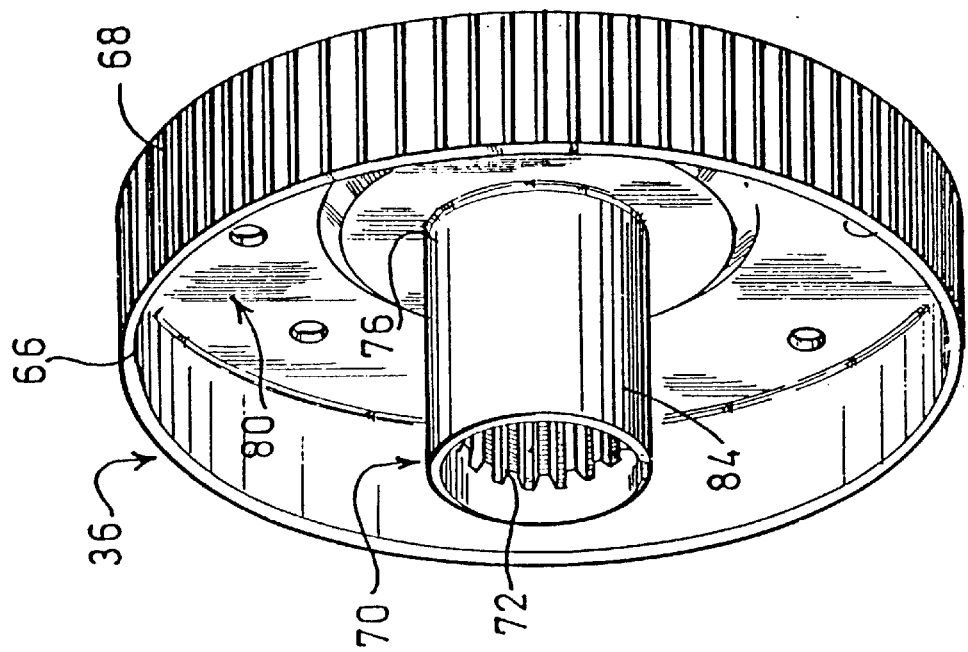
FIG. 2 is a perspective view, shown partly cut away, of the hub of the turbine wheel in the fluid coupling apparatus of FIG. 1.

FIG. 1 shows a fluid coupling apparatus 10, which includes, arranged in a common sealed housing 12 constituting an oil casing, a torque converter 14 and a lock-up clutch 16.

The casing 12 is a driving element, and it is adapted to be coupled in rotation to the crankshaft of the internal combustion engine of the motor vehicle, the transmission of which includes the fluid coupling apparatus.

The casing 12 is annular, and it comprises a first shell member 18 having an annular wall 20 which is oriented generally transversely, together with a second shell member 22 which faces towards the first shell member 18, and which is so configured as to define an impulse wheel 24 having vanes 26. The vanes 26 of the impulse wheel 24 are fixed to the internal face of the shell member 22. The shell members 18,22 are joined to each other sealingly, in this example by welding at their outer peripheries, while the annular transverse wall 20 carries a centring piece at its centre and, at its periphery, threaded portions for coupling it in rotation with the crankshaft (not shown).

The remainder of the torque converter comprises a turbine wheel 28 having vanes 30 facing towards the vanes 26 of the impulse wheel 24 for oil circulation, together with a reaction wheel 32.

The turbine wheel 28 is coupled to a driven shaft 34, for rotation of the latter, through an interposed, central, turbine wheel hub 36, while the reaction wheel 32 is coupled to a sleeve 68 with a free wheel 38 interposed. The sleeve 68 is fixed by means of a splined coupling to a fixed shaft 40, also called a "reaction sleeve", for rotation with the latter.

The fixed shaft 40 is of a tubular design to permit the passage through it of the internal driven shaft 34, which is itself tubular so as to enable oil to pass through it. The driven shaft 34 is fixed to the turbine wheel hub 36, for rotation with the latter, in a manner which will be explained later herein.

The hub 36, which in this example is of metal, constitutes a driven element, and it is part of the lock-up clutch 16, being associated with the output part of the latter. The second shell member 22 includes a sleeve portion 42 which is inserted in a fixed bearing (not shown). The lock-up clutch 16 is disposed axially between the annular transverse wall 20 and the turbine wheel 28 of the casing 12.

The clutch 16 includes a torsion damper 44, a piston 46 which is mounted for movement with respect to the driven element 36, and at least one friction liner 48 which is associated with the piston 46, and which is adapted to be gripped axially between the piston 46 and a counter-piston which consists of an annular portion 50, in facing relationship with it, of the transverse annular wall 20 of the first shell member 18 constituting the driving element. The liner 48 is fixed to the piston 46, or, in another version, to the wall 20.

The torsion damper comprises an input part 46, 52 and an output part 54, together with springs 55 (shown diagrammatically), which are interposed circumferentially between the input part 46, 52 and the output part 54 so as to couple these two parts together. The damper is arranged at the outer periphery of the sealed housing 1 2 and piston 46.

More precisely, the torsion damper 44 comprises two coaxial parts 46 and 52–54, which are mounted for movement of one with respect to the other against the action of the circumferentially acting springs 55, and which consist of an input part comprising the radial plate member 46 which is provided with a guide ring 52, together with an output part 54 which comprises a damper plate 56, which in this example is integral with a radial plate element 60 to be described later herein.

The piston 46 has at its outer periphery an axially orientated annular skirt portion, and the guide ring 52 includes abutment portions for respectively retaining in place, on the outer side in this example, the springs 55, and for abutment of the latter, while the damper plate 56 has abutment and retaining portions for providing abutment for the springs 55 and for retaining the latter in place on the inner side. The guide ring surrounds at least the greater part of the damper plate 56, and is secured to the piston 46 by riveting.

The abutment portions of the damper plate 56 are defined by stamped-out, sinuous abutment elements. In the guide ring 52, the abutment portions consist of two sets of lugs. For more detail, reference should be made to the document WO-A-94/07058.

The output part 54 terminates radially on the inside in a radial plate element 60 which is adapted to enable it to slide axially with respect to the hub 36 of the turbine wheel 28, while coupling it in rotation with this hub.

For this purpose, the radial plate element 60, which is orientated generally transversely, has a toothed central hole 62, which is splined in this example.

The piston 46 is terminated radially on the inside by a cylindrical centring flange 64 which projects towards the turbine wheel 28.

The hub 36, made in accordance with features of the invention, will now be described in greater detail.

The hub 36 is a one-piece component made from metal plate, for example by a roll-forming process.

The hub 36 includes an external cylindrical skirt portion 66, which extends axially towards the wall 20, and which has a cylindrical peripheral surface which includes splines 68 [sic] complementary to those in the hole 62. This skirt portion 66 is therefore of toothed form, in accordance with the invention.

The hub 36 also has a splined central sleeve portion 70, which extends axially towards the centring element of the wall 20, and which has a cylindrical internal surface which includes splines 72, the latter being arranged to enable the sleeve portion 70 to be fitted onto the complementary splined end portion 74 of the shaft 34.

The free end of the sleeve portion receives a sealing ring 170 to provide sealing to the shaft 34.

The axial end 76 of the splined sleeved portion 70 that is nearest to the turbine wheel 28 is joined to the axial end 78 of the skirt portion 66 that is itself nearest to the turbine wheel 28, through an annular radial connecting plate element 80.

The connecting plate element 80 lies substantially in a radial plane, and, as can be seen in FIG. 1, the cylindrical skirt portion 66 extends axially in line with a portion of the splined sleeved portion 70, around the latter, but over an axial length which is shorter that the axial length of the splined sleeved portion 70. The hub 36 is thus U-shaped in cross section, with two axial branches which extend towards the wall 20 and which are of different lengths.

The sets of teeth, or splines, 68 and 72 of the splined skirt portion 66 and splined sleeved portion 70 may be roll-formed.

As can be seen in FIG. 1, the turbine wheel 28 is coupled to the portion of the connecting plate element 80 that lies radially towards the outside, by means of internal radial lugs 82 which are riveted on the plate element 80. In another version, the lugs 82 are replaced by a crown.

The turbine wheel 28 is thus coupled to its hub 36 for rotation with the latter, as is the output part 54 through the splined hole 62.

The splined sleeve portion 70 defines a smooth external cylindrical peripheral surface 84 which constitutes a centring and abutment surface for a centring piece 86, which in this example is of metal, and which is interposed between the hub 36 of the turbine wheel 28 and the centring flange 64 of the piston 46.

The centring piece 86 is a component of thin sheet metal, which is formed by a pressing and/or a roll-forming process.

The piece 86 includes an axially orientated cylindrical internal wall portion 88, which is mounted on the cylindrical surface 84, together with an axially orientated cylindrical external wall portion 90 coaxial with the cylindrical internal wall portion 88, and on which the centring flange 64 is mounted and centered.

The cylindrical internal wall portion 88 and external wall portion 90 are joined together through an annular, radial connecting wall portion 92, which joins together the axial terminal edges of the wall portions 88 and 90 that lie closest to the transverse annular wall 20 of the first shell member 18.

The axial end 94 of the cylindrical external wall portion 90 that lies closest to the radial connecting plate element 80 is extended radially outwards by means of a fastening flange 96, which bears axially against the facing radial surface 81 of the connecting plate element 80, this surface being opposite to the radial surface 79 on which the turbine wheel 28 is riveted.

Apart from the flange 96, the piece 86 has a U-shaped cross section, the axial branches of which extend towards the plate element 80. These branches are of different lengths, with the longer branch 90 being deformed locally so as to form a groove, for containing a sealing ring that acts between the wall portion 90 and the flange 64 of the piston 46.

The centring piece 86 is fastened on the hub 36 of the turbine wheel 28 by riveting in the vicinity of the portion 98, extending radially outwardly, of the fastening flange 96.

The hub 36 of the turbine wheel 28 constitutes a sub-assembly with the centring piece 86 and with the turbine wheel 28.

Fitting and rotational coupling of this sub-assembly with the output member 54 of the lock-up clutch 16 and with the piston 46 is particularly simple, in that it is sufficient to introduce, simultaneously, the splined cylindrical skirt portion 66 into the hole 62, and the cylindrical external wall portion 90 into the centring flange 64 of the piston 46, without any associated riveting or sealing operation.

The roll forming of the skirt portion 66 is preferably carried out using a roll which co-operates with the internal wall surface of the skirt portion 66, so as to force the material of the latter into a die ring which is formed with splines and which is in contact with the external surface of the skirt portion 66. For the sleeve portion 70 the method is reversed, the roll co-operating with the outer periphery of the sleeve portion 70 so as to force the material of the latter inwardly and cause it to penetrate into a die ring formed with splines.

It will be noted that the hub 36 and the centring piece 86 are fitted in head-to-toe relationship with each other, and that in this example they are press-formed from sheet metal.

The sub-assembly consisting of the hub 36 and centring piece 86 is thus light in weight. It will be appreciated that the hub 36 can be standardised, and that the centring piece 86 can be used as a component for adaptation purposes, according to the size of the radial plate element 60.

In another version, the skirt portion 66 may of course be comb shaped, having at its free end axial teeth alternating with slots, its end 78 being continuous. The hole 62 then has radial teeth alternating with slots, which mesh with the teeth and slots of the skirt portion 66, which is therefore toothed, as is the hole 62.

In a further version, the piece 86 may be secured to the hub 36 by welding. Similarly the turbine wheel 28 may be fixed to the hub 36 by welding.

The guide ring 52 is able to retain the springs, being the form of a half shell.

All of the arrangements described in the document WO-A-94/07058 may of course be envisaged.

We claim:

1. Fluid coupling apparatus (10) comprising a turbine wheel (28) which is coupled to a turbine wheel hub (36)

constituting a driven element, for rotation of the hub (36) with the turbine wheel to thereby couple the turbine wheel in rotation with an output shaft (34), together with an impulse wheel (24) which is coupled to a driving element for rotation with the impulse wheel, and comprising a lock-up clutch (18) which is adapted to act between the driving element and the driven element, and which comprises two coaxial parts (46, 52 to 54) which are mounted for movement of one with respect to the other against the action of circumferentially acting springs (55), the parts being an input part comprising a piston (46), and an output part (54) which is extended radially inwardly by a radial plate element (60) for coupling the radial plate element in rotation with the hub (36) of the turbine wheel (28), wherein the hub (36) of the turbine wheel (28) is made in one piece and comprises:

a cylindrical skirt portion (66) formed with external teeth (68), which is mounted for axial sliding movement in a toothed central hole (62) of the radial plate element (60) of the output part of the look-up clutch (16);

a sleeve portion (70) having internal splines (72) and mounted on a splined portion (74) of the output shaft (34); and an annular radial connecting plate element (80) joining the splined skirt portion (66) to the splined sleeve portion (70), wherein the hub (36) of the turbine wheel (28) is a sheet metal component.

2. Fluid coupling apparatus according to claim 1, wherein the toothed skirt portion (66) extends axially.

3. Fluid coupling apparatus according to claim 1, wherein the connecting plate element (80) joins an axial end (76) of the toothed sleeve portion (70) to an axial end (78) of the splined skirt portion (661, and the connecting plate element (80) lies substantially in a radial plane.

4. Fluid coupling apparatus according to claim 1, wherein the cylindrical skirt portion (66) of the turbine wheel hub (36) is splined.

5. Fluid coupling apparatus according to claim 4, wherein the said splined cylindrical skirt portion (66) is obtained by a roll forming process.

6. Fluid coupling apparatus comprising a turbine wheel (28) which is coupled to a turbine wheel hub (36) constituting a driven element, for rotation of the hub (36) with the turbine wheel to thereby couple the turbine wheel in rotation with an output shaft (34), together with an impulse wheel (24) which is coupled to a driving element for rotation with the impulse wheel, and comprising a lock-up clutch (18) which is adapted to act between the driving element and the driven element, and which comprises two coaxial parts (46, 52 to 54) which are mounted for movement of one with respect to the other against the action of circumferentially acting springs (55), the parts being an input part comprising a piston (46), and an output part (54) which is extended radially inwardly by a radial plate element (60) for coupling the radial plate in rotation with the hub (36) of the turbine wheel (28), wherein the hub (36) of the turbine wheel (28) is made in one piece and comprises:

a cylindrical skirt portion (66) formed with external teeth (68), which is mounted for axial sliding movement in a toothed central hole (62) of the radial plate element (60) of the output part of the look-up clutch (16);

a sleeve portion (70) having internal splines (72) and mounted on a splined portion (74) of the output shaft (34); and an annular radial connecting plate element (80) joining the splined skirt portion (66) to the splined sleeve portion (70), said device further includes a flange (64) for centring the piston (46) with respect to the hub (36) of the turbine wheel (28) and a centring piece (86) is interposed between the centring flange (64) of the piston (46) and the hub (36) of the turbine wheel (28).

7. Fluid coupling apparatus according to claim 6, wherein the centring piece (86) includes a cylindrical internal wall portion (88) mounted on the splined sleeved portion (70, 84), a cylindrical external wall portion (90) on which the centring flange (64) is mounted, and a radial wall portion (92) connecting the cylindrical internal wall portion (88) and external wall portion (90) together.

8. Fluid coupling apparatus according to claim 7, wherein the cylindrical external wall portion (90) is joined to the radial connecting wall portion (92) at a first axial end, and a second axial end (94) of the cylindrical external wall is fixed to the hub (36) of the turbine wheel (28).

9. Fluid coupling apparatus according to claim 8, wherein the second axial end (94) of the cylindrical external wall portion (90) of the centring piece (86) is extended axially outwardly by an annular fastening flange (96) which is adjacent to a radial surface (81), in facing relationship with it, of the connecting plate element (80) of the hub (36) of the turbine wheel (28), and which is fixed to that radial surface.

10. Fluid coupling apparatus according to claim 9, wherein the turbine wheel (28) is fixed to the connecting plate element (80) of the hub (36) of the turbine wheel (28).

11. Fluid coupling apparatus according to claim 10, wherein the turbine wheel (28) is fixed on the radial surface (79) of the connecting plate element (80) which is opposite to the radial surface (81) to which the annular fastening flange (96) is adjacent.

12. Fluid coupling apparatus according to claim 6, wherein the centring piece (86) is a sheet metal component.

* * * * *